(No Model.)　　　　　　　　　　　　　　　　　　　　10 Sheets—Sheet 1.
J. L. STEWART.
PROCESS OF AND APPARATUS FOR MANUFACTURING GAS.
No. 300,330.　　　　　　　　　　　Patented June 10, 1884.
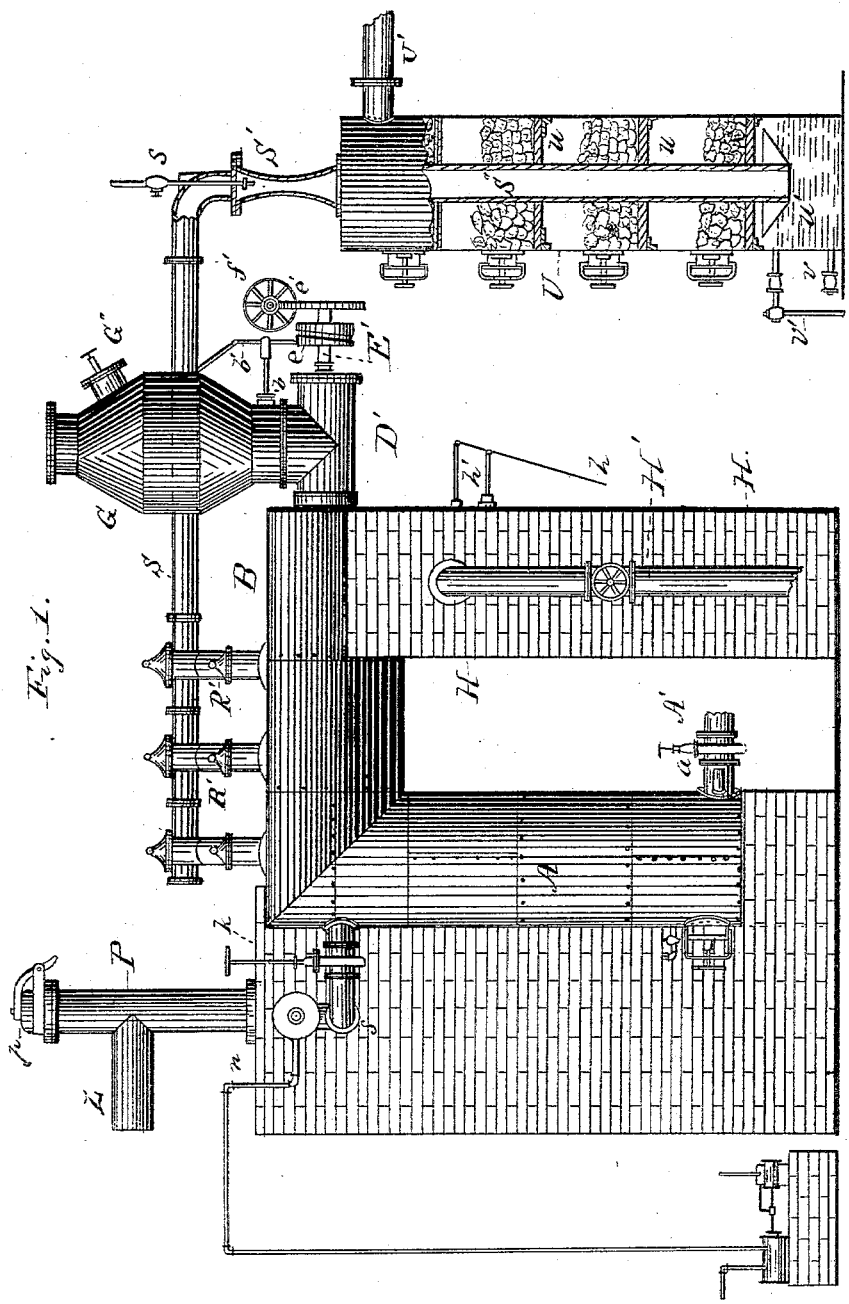
WITNESSES
Chas. R. Burr
Geo. H. Harvey
INVENTOR
John L. Stewart
per C. E. Duff
Attorney (No Model.) 10 Sheets—Sheet 2.
J. L. STEWART.
PROCESS OF AND APPARATUS FOR MANUFACTURING GAS.
No. 300,330. Patented June 10, 1884.
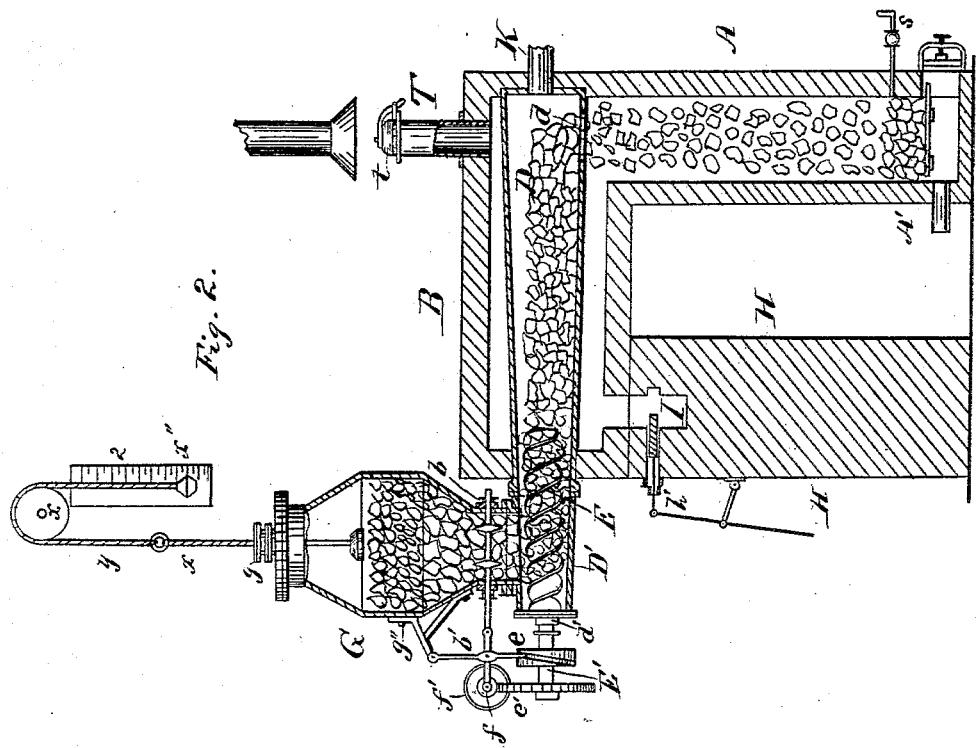
WITNESSES
Chas. R. Burr
Geo. H. Harvey
INVENTOR
John L. Stewart
per O. E. Duff
Attorney (No Model.)　　　　　　　　　　　　　　　　　　10 Sheets—Sheet 3.
J. L. STEWART.
PROCESS OF AND APPARATUS FOR MANUFACTURING GAS.
No. 300,330.　　　　　　　　　　Patented June 10, 1884.
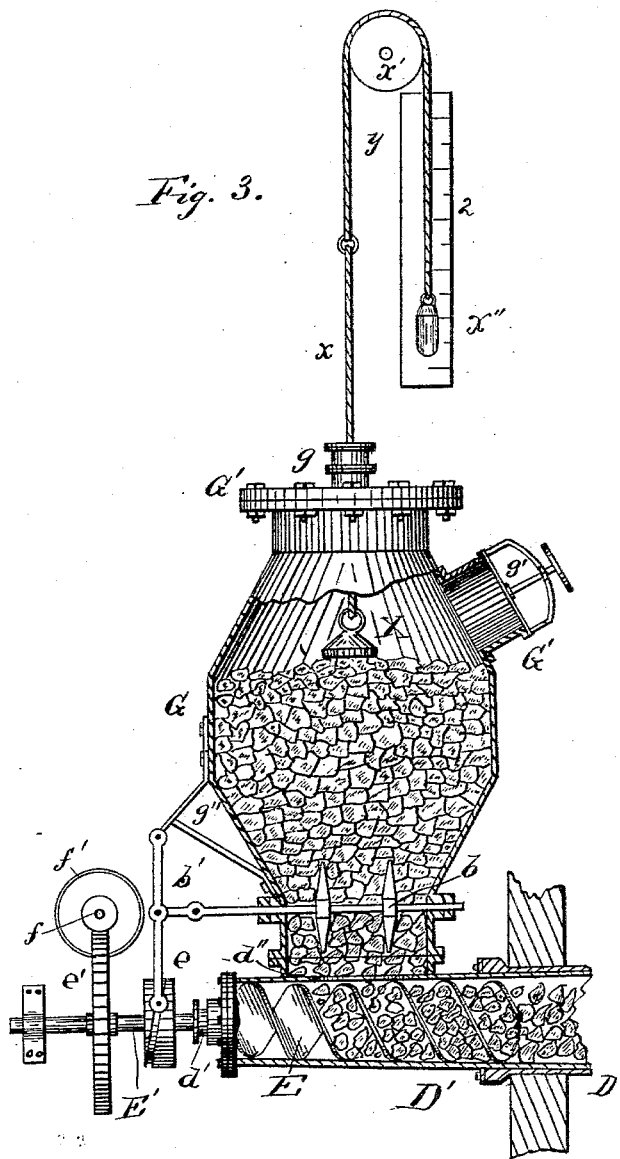

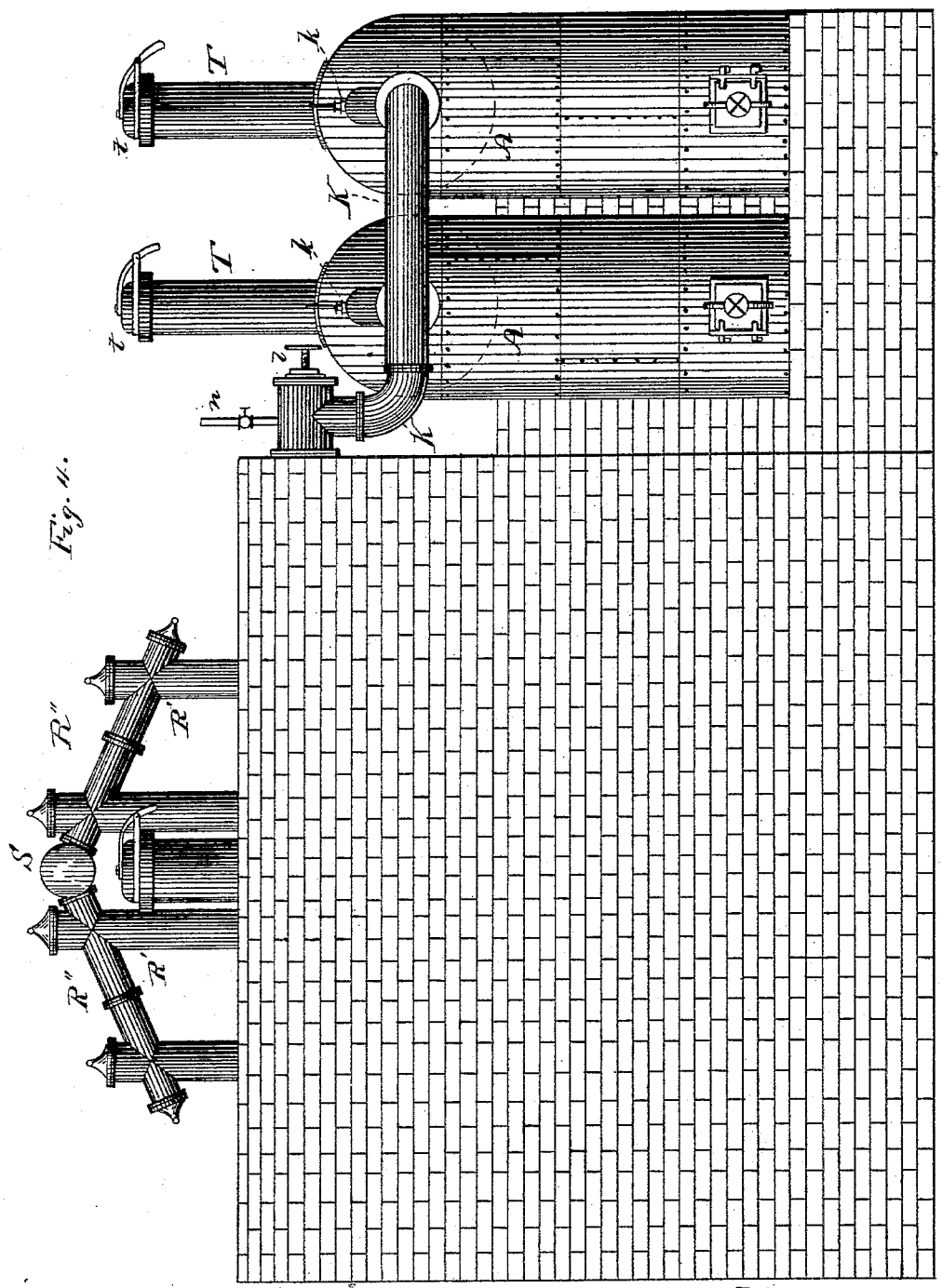

(No Model.) 10 Sheets—Sheet 5.
J. L. STEWART.
PROCESS OF AND APPARATUS FOR MANUFACTURING GAS.
No. 300,330. Patented June 10, 1884.
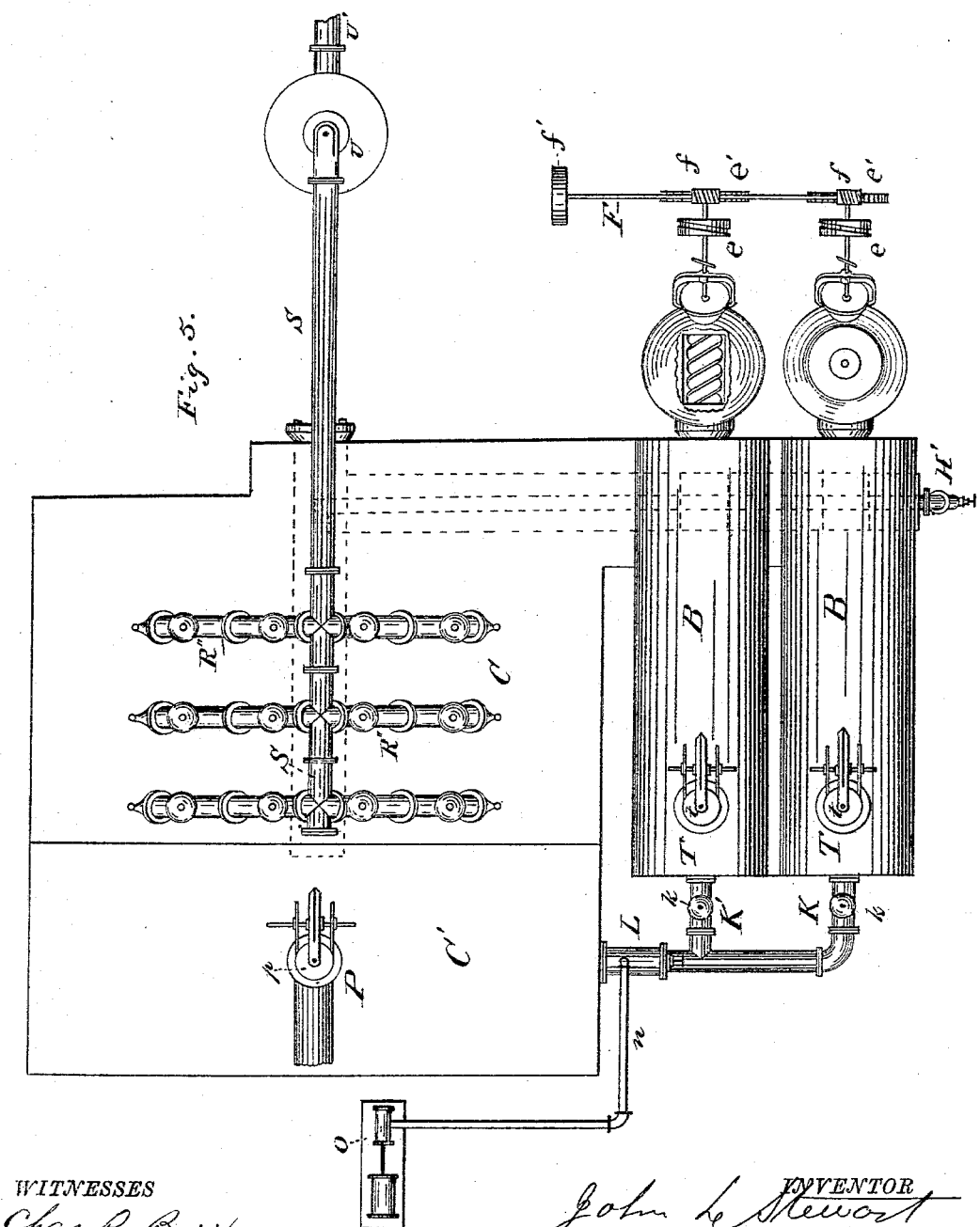

(No Model.)
10 Sheets—Sheet 6.
J. L. STEWART.
PROCESS OF AND APPARATUS FOR MANUFACTURING GAS.
No. 300,330.   Patented June 10, 1884.
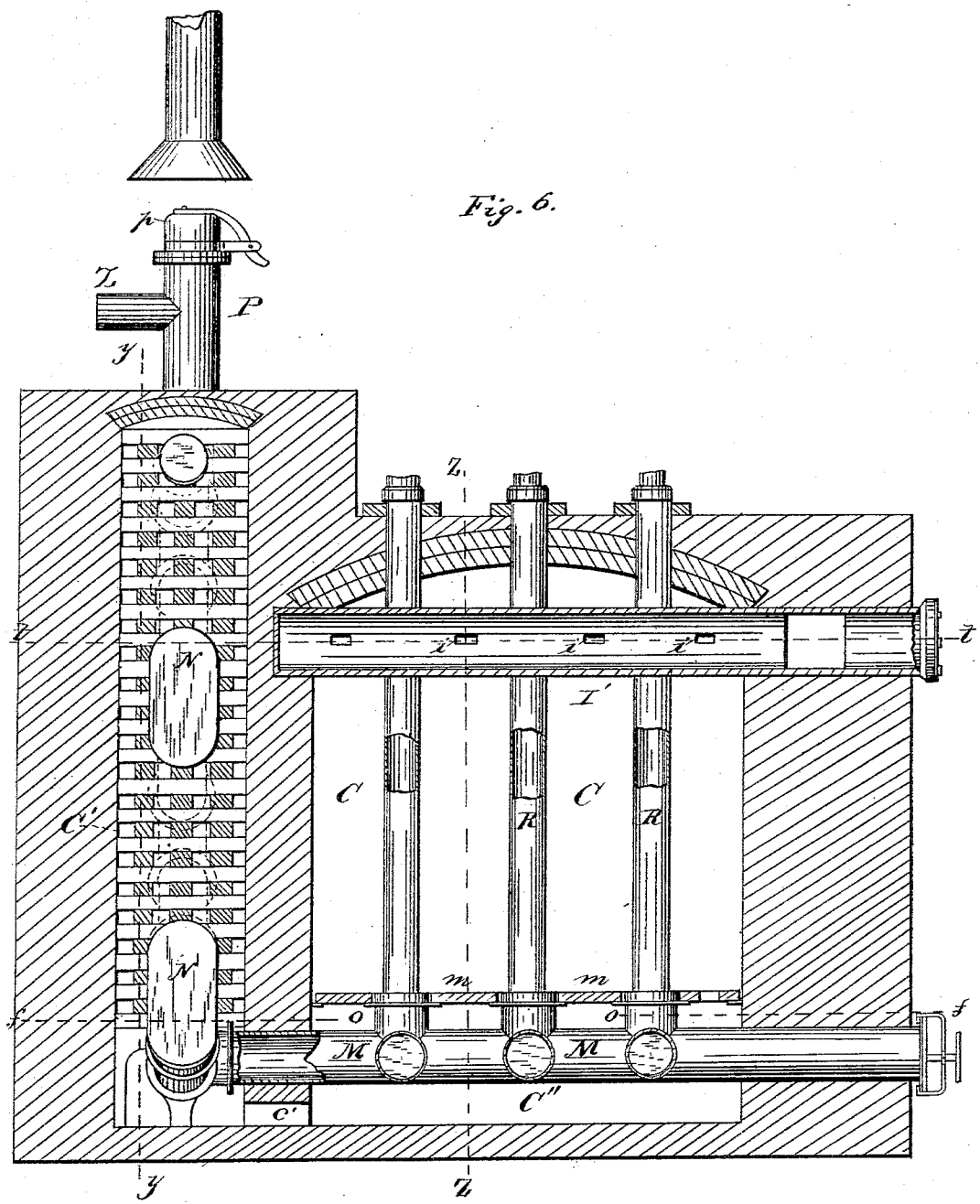

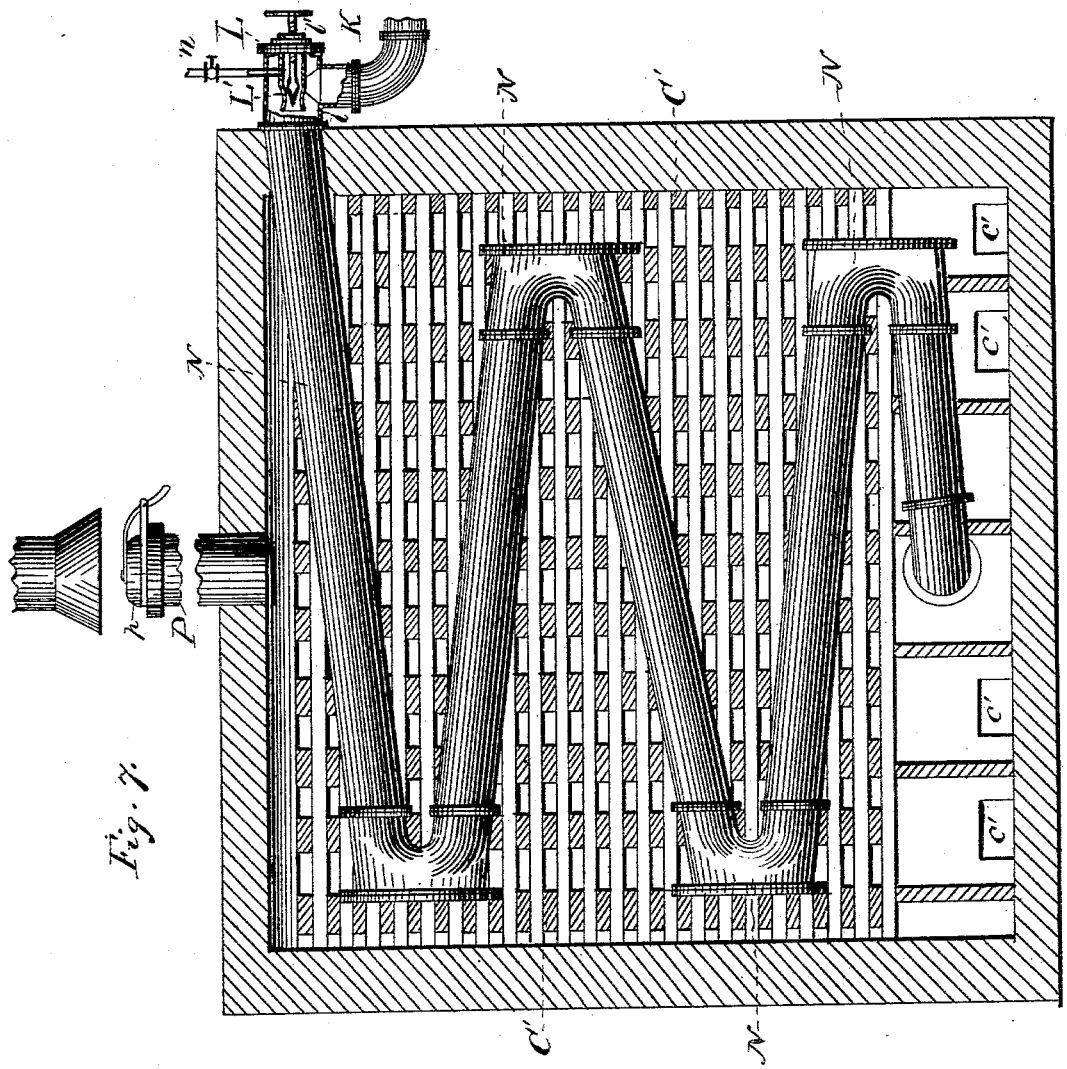

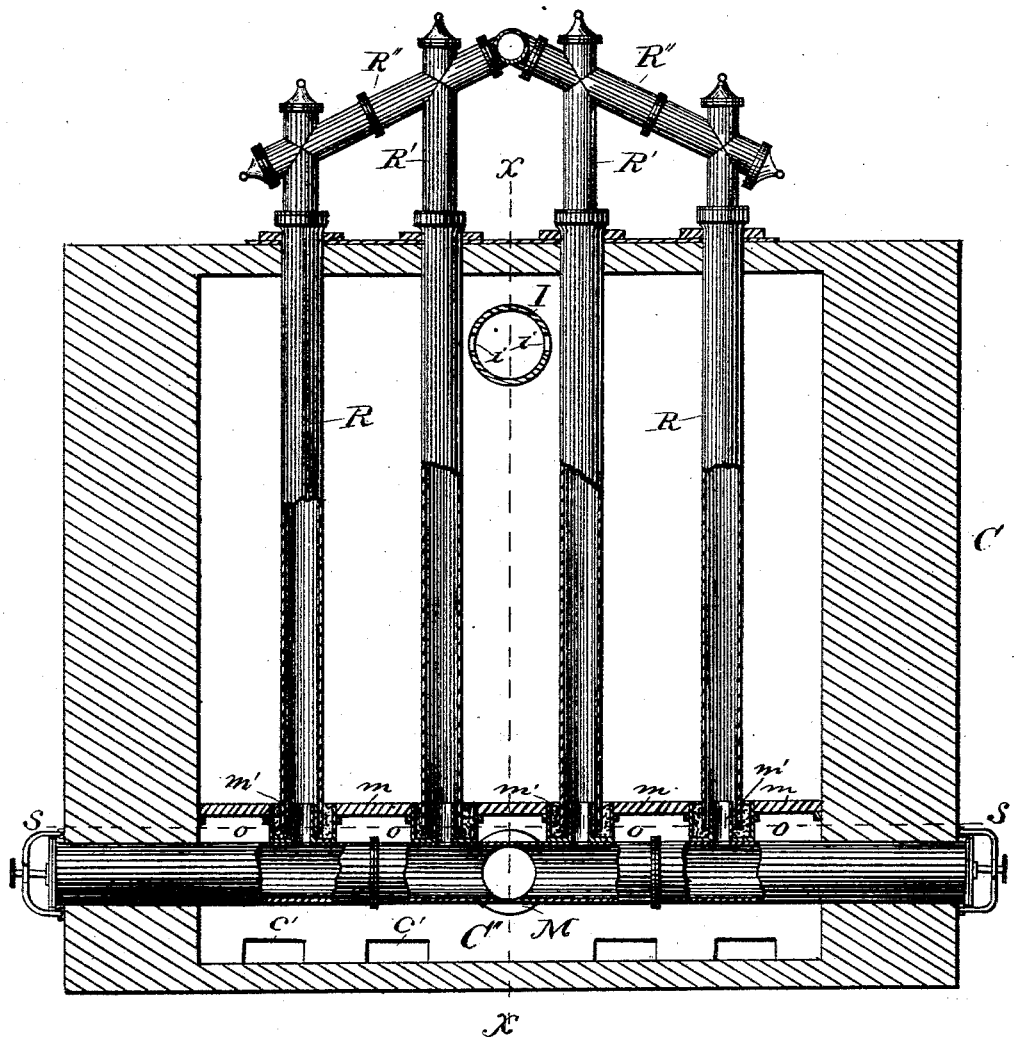

(No Model.) 10 Sheets—Sheet 9.
J. L. STEWART.
PROCESS OF AND APPARATUS FOR MANUFACTURING GAS.
No. 300,330. Patented June 10, 1884.
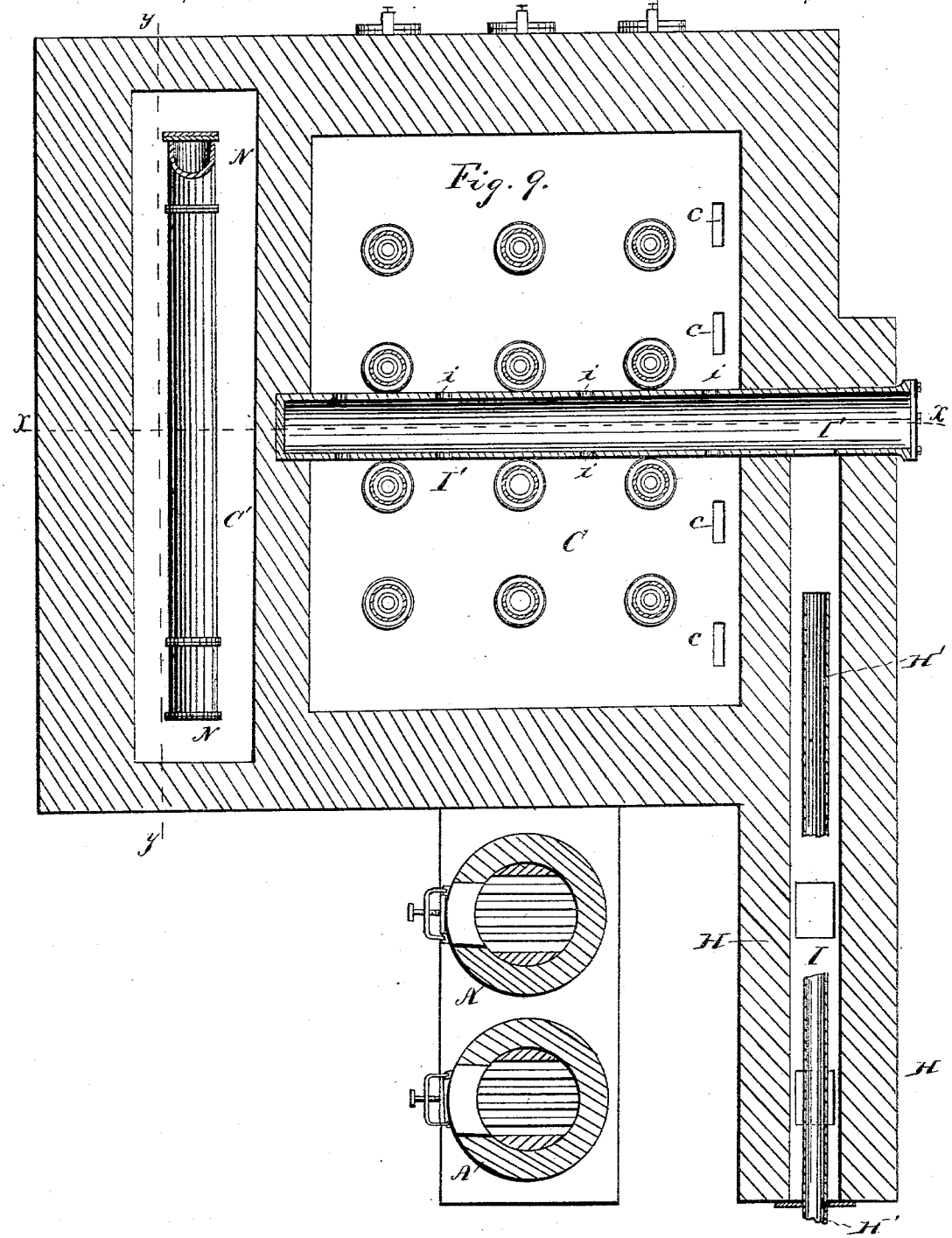

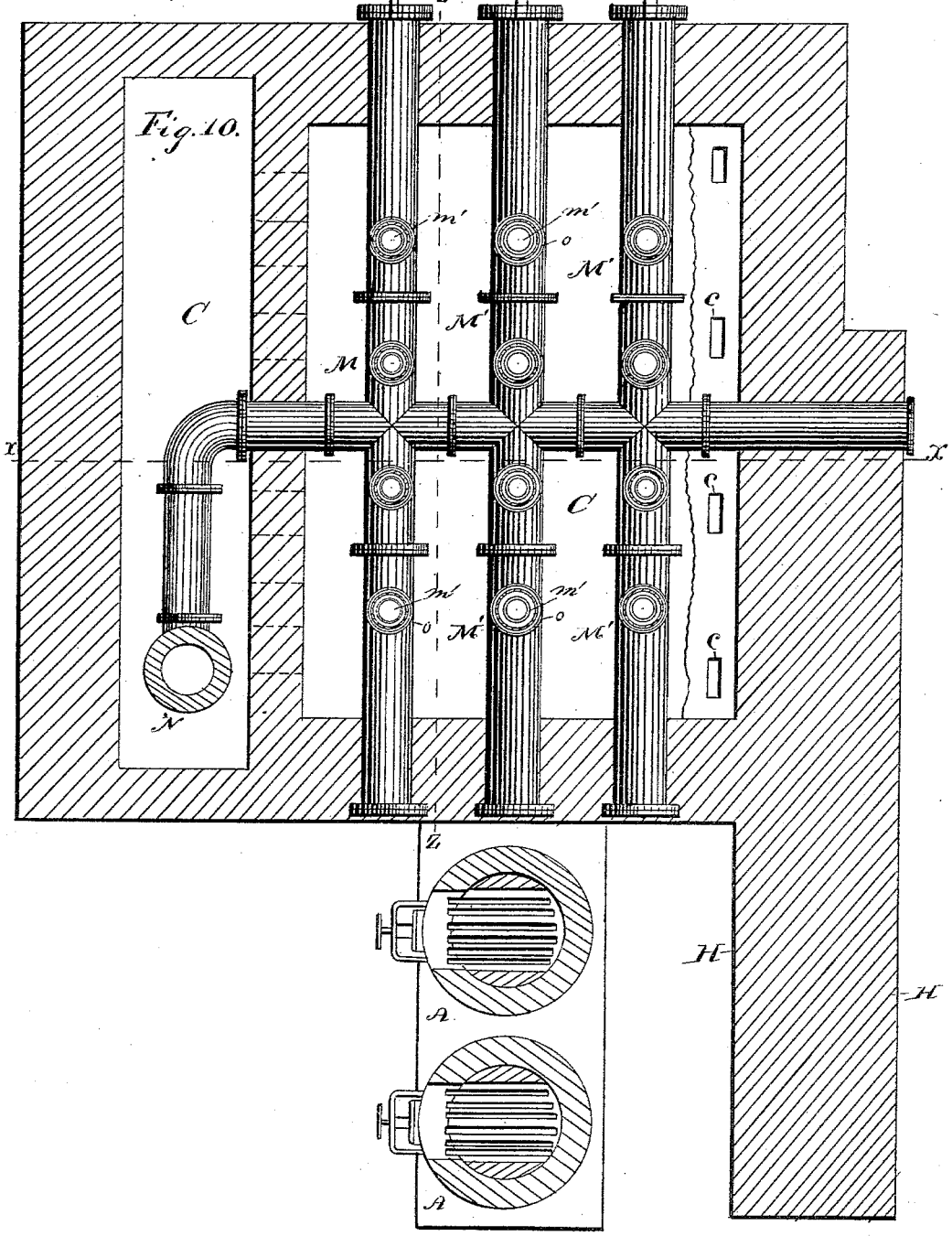

United States Patent Office.

JOHN L. STEWART, OF PHILADELPHIA, PENNSYLVANIA.

PROCESS OF AND APPARATUS FOR MANUFACTURING GAS.

SPECIFICATION forming part of Letters Patent No. 300,330, dated June 10, 1884.

Application filed August 9, 1883. (No model.)

*To all whom it may concern:*

Be it known that I, JOHN L. STEWART, of Philadelphia, in the county of Philadelphia and State of Pennsylvania, have invented certain new and useful Improvements in Processes of and Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of gas for heating and illuminating purposes by the decomposition of steam in contact with incandescent or highly-heated carbonaceous fuel, the distillation of bituminous coal, and the vaporization and decomposition of liquid hydrocarbon commingled with hot gas from the generator in vaporizing conduits and retorts.

In carrying out my invention bituminous coal is distilled and reduced to coke, which is discharged while hot into the steam-decomposing chambers. Steam is decomposed by passage through the hot fuel, and the resulting gases, together with the carbureted hydrogen from the coal, are conducted while hot directly into the liquid-hydrocarbon-vaporizing conduits, into which at the same time is forced the oil, under a high pressure, in the form of a jet through an injection-nozzle in sufficient quantity to enrich the gas from the generators to any desired candle-power before entering the fixing-retorts. This jet assists in drawing the gases from the generating-chamber into the commingling and vaporizing chamber. The gases and vapors can be accelerated in their flow from the generator through the vaporizing-conduits and the fixing-retorts by using an ordinary exhauster. By this improvement the gases produced in the generator are conducted while hot directly into the mixing and vaporizing conduits, where they aid materially in vaporizing the oil. The coal is fed into and gradually forced through the retorts by an improved feeding and charging apparatus. Hot gas and hot air are supplied to and burned in the retort-chamber containing the retorts in which the gases and vapors are combined and fixed.

The principal feature of this process is the mixing and commingling in suitable chambers or conduits the gases from the generator with richer hydrocarbons in suitable proportion to enrich the same to any desired candle-power, then superheating the same in their passage before entering the fixing-retorts by the waste heat as they pass from chamber C to chamber $x''$, so that the hydrocarbon vapors, being commingled with the gases from the generators in the proper proportion to produce the desired candle-power in the conduit-pipes, become highly heated in their passage, and enter the fixing-retorts at or near the temperature of decomposition into fixed gases.

The advantages of this process are twofold: first, the hydrocarbon vapors at the time of undergoing destructive distillation and fixing into permanent gas in the fixing-retorts being mixed with the gas from generators, are thereby supplied with the proper equivalents of hydrogen and carbonic-oxide gases, so as to prevent the excessive precipitation of fixed carbon, which is the case when rich hydrocarbon vapors are decomposed by themselves into fixed gas; second, owing to the fact that the commingled gases and hydrocarbon vapors enter the decomposing and fixing retorts at or near the temperature of destructive distillation, it is not necessary to have the retorts as long, and they need not be heated to as high a degree of temperature as when the hydrocarbons are admitted or run into the retorts in the liquid or cold state. By this process the rich hydrocarbon vapors are almost instantly decomposed and fixed with the other lighter or partially non-luminous gases from the generator and discharged from the fixing-retorts, thereby preventing the destruction of the richer portions of the commingled and fixed gases into fixed or solid carbon.

Besides the improvement in the process, there are numerous improvements in the parts and combinations and arrangements thereof constituting the apparatus, which will be hereinafter described, and particularly defined in the claims.

Having stated the nature of my invention, I will now describe it more particularly with reference to the accompanying drawings, in which—

Figure 1 represents a side elevation of the generating apparatus and a vertical section of the scrubber. Fig. 2 represents a longitudinal vertical section of the generator, the coal-retort, and the charging apparatus. Fig. 3 is a vertical section of the charging apparatus on an enlarged scale. Fig. 4 represents a rear end view in elevation of the apparatus. Fig. 5 represents a top plan view thereof. Fig. 6 represents a vertical section on line $x\ x$, Fig. 8, through the chambers containing the fixing-retorts and the vaporizing-conduits. Fig. 7 represents a vertical section on the line $y\ y$, Fig. 6, through the chamber containing the vaporizing-conduits at right angles to Fig. 6. Fig. 8 represents a vertical section on line $z\ z$ through the retort-chamber at right angles to Fig. 6. Fig. 9 represents a horizontal section on the line $t\ t$, Fig. 6, through the upper portion of the apparatus. Fig. 10 represents a horizontal section on the line $s\ s$ through the lower portion of the apparatus.

The generating apparatus is composed of four principal parts or chambers—one or more may be in duplicate—together with connecting pipes and flues, coal feeding or charging mechanism, an oil-pump, an exhauster, a scrubber, &c., and the chambers in which the gas is produced are named, respectively, the generating and decomposing chambers A, two of which are used, the retort and distilling-chambers B, two of which are shown, one connecting freely with each chamber A, the chamber C′, containing the vaporizing-conduits, connected by pipes with the retort-chambers B, and the chamber C, containing the fixing-retorts which connect with the vaporizing-conduits, and in which the mixed vapors and gases are combined and fixed.

The generating-furnaces A are built of fire-brick and set vertically upon a brick foundation, and are covered by an iron shell. Each is provided with an air-blast pipe, A′, having valve $a$ entering its ash-pit, and a steam-inlet pipe, $s$, entering above the grate, and each has at its top a smoke-stack, T, having a close-fitting lid, $t$.

The horizontal retort-chambers B are also built of fire-brick, covered with riveted plates of boiler-iron. They open freely into the decomposing-chambers A, and contain the coal distilling retorts D, which pass through the front end walls of the chambers and rest in their rear ends in recesses in the outer walls of chambers A. Retorts D have openings $d$ in their lower sides at their rear ends, for the discharge of coke into chambers A, and they have mouth-pieces D′, having tight-fitting end caps, through which pass the shafts E′ of the feeding-screws E, which shafts pass through stuffing-boxes $d'$, fitted to the caps. Each shaft E′ has mounted upon it a cam-wheel, $e$, and a spur-wheel, $e'$. A shaft, F, Fig. 5, having a belt-wheel, $f'$, carries worm-wheels $f\ f$, which engage the spur-wheels $e\ e$, for imparting motion to the shaft E′ and feeding-screw E. The fuel-hopper G is mounted on the mouth-piece D′, over openings $d''$, and has a cover, G′, bolted to its top, and the cover has a stuffing-box, $g$, for the passage of the indicator-rod $x$. A coal-supply chute, G′, having a tight-fitting lid, $g'$, is secured to the side of the hopper. It is thus seen that the hopper may be closed gas-tight. A weight or follower, X, is attached to the lower end of the rod $x$, and a rope or chain, $y$, is attached to the upper end of the rod and passes over the pulley $x'$, and has a weight, $x''$, attached to its other end in contact with a graduated scale, 2. These devices indicate the height of the coal in the hopper, and show when it should be renewed. An agitating-bar, $b$, having teeth, passes horizontally through the outlet-neck of the hopper, and is pivoted to the lever $b'$, which is pivoted at one end to a bracket, $g''$, projecting from the hopper, and has at its other end a pin engaging with the grooves in the cam-wheel $e$, by which reciprocating motion is imparted to the agitator for shaking the coal down into the feeding-screw and mouth-piece.

The front end of retort-chambers B rest upon wall H, which has a flue, I, in its upper part opening into each retort-chamber, and each opening is provided with a slide-valve or damper, $h'$, for controlling the flow of products of combustion or other gases through flue I into the retort-chamber C. (See Figs. 2 and 5.) An air-blast pipe, H′, having a valve, $h$, passes through flue I, opening near the rear end thereof, for supplying air and heating it to support combustion of the gaseous products as they are being discharged into chamber C. The flue I leads into and extends across the top of chamber C, having perforations $i$. (See Figs. 6 and 9.) Here the gaseous products and air are burned for heating the fixing-retorts, and the hot products are passed from chamber C into lower chamber, C″, and then into the base of chamber C′, containing the vaporizing-conduits. The products of combustion pass from chamber C through openings $c$ in the horizontal partition $m$, near the base thereof, into the sub-chamber C″, and thence through openings $c'$ in the vertical division-wall between chambers C and C′ into chamber C′, from which they pass off by the stack P at the top, as shown in Figs. 6, 7, and 8, or to connect with a steam-boiler flue at outlet Z.

Pipes K K′, having valves $k\ k$, connect the upper ends of the decomposing-chambers A with the mouth-piece L of the vaporizing and mixing conduits N in the chamber C′, as shown in Figs. 1, 4, 5, and 7. The mouth-piece L has extending into it an oil-spraying nozzle, L′, into which extends a conical valve, $l$, having a screw-threaded stem, $l'$, passing through the close-fitting cap of the mouth-piece, for the purpose of regulating the pressure of the spray. An oil-supply pipe, n, connecting with the oil-pump O, connects with the nozzle L', for supplying oil, preferably, under pressure. The vaporizing-conduit N passes in an inclined zigzag course through chamber C', and connects at the lower end with the distributing-pipes M M'; Figs. 6 and 10. The horizontal pipes M' have projecting from their upper surfaces the seal-cups o, for receiving the lower ends of vertical retorts R, and also have rising from them, within the cups, the short vertical pipes m', which fit inside of the retorts. Asbestus or sand is packed in the cups around the lower ends of the retort and the pipes m', for making a tight joint between them. The pipes m' afford passages for the mingled gases and vapors from the distributing-pipes M M' to the vertical retorts. The fixing-retorts R have at their top ends above chamber C stand and bridge pipes R' R'', connecting to a main discharge or exhaust pipe, S, as shown in Figs. 1, 5, and 8. The bridge-pipes connecting the retorts nearest the main exhaust-pipe can be provided with valves, so as to equalize the exhaust from each retort. The exhaust-pipe S has a contracted exhaust-nozzle, S', from which extends the pipe S'', down through the scrubber U, into the water-seal chamber u', where it dips into the water. A steam or water jet pipe, s, projects into the nozzle S', for exhausting the gas from the retorts R. An ordinary steam or water jet exhauster may be used at the entrance to the scrubber, or the gas can be exhausted in the ordinary way. By the construction and arrangement of pipes shown the ordinary dip-pipes and hydraulic mains are rendered unnecessary, and the construction is thus cheapened and the operation simplified. The scrubber is provided with grates u, supporting coke or other scrubbing material, and with a gas-outlet pipe at the top. It has also water inlet and overflow pipes r r' at the bottom.

The chamber C' is preferably filled with loosely-laid brick for holding the heat and maintaining a uniform temperature around the vaporizing-conduit, and the chamber has a smoke-stack, P, having a lid, p, rising from its top, which serves as a damper or to force waste heat through a steam-boiler. The valve h' in the flue I leading from chambers B may be water-cooled in order to protect it from the intense heat of the gases conveyed to the combustion-chamber C. The gas-distributing pipes M M' in chamber C' extend through the side walls, and their ends are closed by removable caps, so that the pipes may be cleaned when necessary.

The operation of the apparatus is as follows: Fire is kindled in both decomposing and generating furnaces A, and they are gradually supplied with fuel, preferably coke or anthracite coal, and air-blasts supplied till a body of incandescent fuel several feet thick is obtained, and at the same time the hot gaseous products are conducted through flue I into the burner-flue I', where combustion takes place, hot air being supplied through pipe H. The hot products circulate around the retorts R, thereby heating them, then pass through openings c' into chamber C'', where they heat the distributing-pipes M M', and finally pass through openings c' into chamber C', heating the conduits N, and then escape by the stack or steam-boiler. The decomposing-chambers, the coal-distilling retorts, the vertical fixing-retorts, and the vaporizing-conduits being all suitably heated, the air-blasts are shut off from one of the decomposing-chambers and steam admitted to such chamber for decomposition. At about this time, or before, bituminous coal is charged into the retorts D in one or both of the chambers B, preferably in a gradual manner, by the feeding and conveying apparatus, though the retorts may be charged by hand, and the coke resulting from the distilled coal periodically shoved back into the decomposing-chamber. While steam is being decomposed in one of the furnaces A the gaseous products from the other one are burned in the chambers C C', for maintaining the heat of the fixing-retorts and the vaporizing-conduit. The gases now resulting from the decomposition of steam, consisting of hydrogen and carbonic oxide, and the carbureted hydrogen distilled from the coal, are conducted while hot directly into the vaporizing and mixing conduit N, their flow being accelerated by the jet of oil forced by the pump into and through the injector L' in the mouth-piece L of the conduit N. The hot gases and the sprayed oil injected in under pressure intimately mingle in the heated conduit, the oil being vaporized and combined with the gases, and superheated on their passage to the fixing-retorts. The hydrogen and carbonic oxide are thus enriched or carbureted to form the desired candle-power of illuminating-gas. The gases and vapors are conducted from the conduit into and through fixing-retorts R, where they are fully combined and converted into a fixed gas. The hydrogen and carbonic-oxide gases being mixed with the oil-vapors, protect them from destructive decomposition and prevent to a greater degree the formation of hard carbon and lamp-black while being converted into fixed gas in their passage through the fixing-retorts. The completed gas is finally exhausted from the retorts and forced by the injector or an exhauster down into the single hydraulic seal-chamber u' in the base of the scrubber, or an ordinary exhauster may be used to exhaust the gas from the retorts. It is thus seen that advantage is taken of the hot gas directly from their generating-chambers for mingling with and assisting in vaporizing the oil. The decomposition of steam is continued in the first chamber till the contained fuel is reduced below the successful working temperature, when the steam is shut off and the air-blast admitted for again raising the fuel to incandescence. At the same time the air-blast is now shut off from the other now heated generating-furnace and steam admitted to the hot fuel therein, the valves in the flue I being at the same time reversed in position, so as to shut off the hydrogen and carbonic oxide produced in the generator, where steam is being decomposed from flue I, and admit the gaseous products to such flue from the generator wherein air is being admitted. If necessary, however, for maintaining the proper temperature of the fixing-retorts and the vaporizing-conduits, part of the hydrogen and carbonic oxide may be burned in chamber C. As the fuel is consumed in the decomposing and generating furnaces it is renewed by coke from the coal-distilling retorts, which coke is gradually forced from the retorts and deposited while hot into the furnaces.

By means of the two generating-furnaces a constant supply of hydrogen and carbonic oxide is obtained for use with the oil for manufacturing illuminating-gas, and a constant supply of heating-gas is obtained for combustion in chambers C C', for maintaining the heat of the fixing-retorts R and the vaporizing-conduit N. By means of the coal-retorts a constant supply of rich carbureted hydrogen is obtained from the bituminous coal distilled, and a constant supply of hot coke is obtained for replenishing the steam-decomposing furnaces as the fuel therein is consumed. Oil for enriching or carbureting the water-gas may be admitted directly into the vertical fixing-retorts by pipes extending down into them, or other means.

The matter stated below, which is herein described and shown, is covered by claims in my application filed May 2, 1883, and is therefore disclaimed in this application, viz:

"The combination of the generator for producing water-gas, the vaporizing and mixing conduits or retorts provided with an injecting and atomizing device, the combining and fixing retorts and connecting-pipes.

"The two generators for producing water-gas, in combination with the vaporizing-conduits, the connected vertical fixing-retorts, pipes connecting the water-gas producers with the retort-ovens for supplying gas for heating the retorts, a pipe connecting the water-gas producers with the vaporizing-conduits, and an oil-supply pipe.

"The vaporizing conduits or retorts having connecting gas and oil supply pipes, in combination with the vertical fixing-retorts, a large connecting-pipe extending from the base of the vaporizer through a chamber below the fixing-retorts, and short stand-pipes uniting such pipe with the bases of the vertical retorts.

"The gas-retort oven having a horizontal division-wall or diaphragm near the base thereof provided with numerous outlet-passages between the retorts leading to the flue containing the vaporizing-conduits, in combination with the heating-gas producers, one or more, and a connecting-pipe conducting heating-gas into the top of the retort-oven."

Having described my invention, what I claim, and desire to secure by Letters Patent, is—

1. The process of generating gas, which consists in producing water-gas by the decomposition of steam in contact with heated carbon, drawing such gas while hot directly into a vaporizing and mixing conduit by means of a jet of oil under pressure, and thereby forcing the gas into the vaporizer and carbureting it, and then combining and fixing the mixture in heated retorts.

2. The process of generating gas, which consists in raising a body of fuel to a state of incandescence by a blast of air, heating one or more coal-distilling retorts by the hot gaseous products, and also heating one or more sets of fixing-retorts by the combustion of such products by means of air, decomposing steam in the incandescent fuel, and distilling bituminous coal by the heat of the resulting gases, then conducting such gases and the carbureted hydrogen from the coal to the heated retorts, and therein carbureting them with hydrocarbons and converting the mixture into a fixed gas.

3. The process of generating gas, which consists in raising a body of fuel in one generator to incandescence by an air-blast, and heating one or more coal-distilling retorts by the waste gaseous products, and the partial combustion of the same, reducing the coal to coke, and at the same time decomposing steam in the other generator and distilling bituminous coal, conducting away the gases, carbureting and fixing them in heated retorts, and replenishing the fuel as it is consumed in the steam-decomposing chamber by discharging therein hot coke from the distilling-retorts.

4. The two decomposing and generating furnaces A, in combination with a chamber, C, containing retorts for combining and fixing gas, and a perforated flue extending through and across chamber C, the valved flue connecting generators A with chamber C, and an air-supply pipe extending into such flue, whereby air is heated for supporting combustion of the waste gaseous products from the generators around the retorts.

5. The generating-furnaces A, the connected retort-chambers B, in combination with the coal-retorts, a gas-eduction pipe conducting gas from both the furnace and retorts, the tight coal-feeding apparatus and supply-hoppers, and the operating mechanism therefor, as described.

6. The combination of a steam decomposing and generating furnace having air and steam supply pipes, a connected retort-chamber containing a coal-retort, with the fixing-retorts and connecting-pipes.

7. The process of generating gas, which consists in raising a body of fuel to a state of incandescence by a blast of air, heating one or more coal-distilling retorts by the initial heat of the resultant gases, and a partial combustion of them, and also heating one or more sets of retorts by the complete and final combustion of the same, decomposing steam meantime by the incandescent fuel, utilizing the heat of resultant gases to distill bituminous coal, then conducting such gases and the carbureted hydrogen from the bituminous coal to heated mixing-conduits, carbureting them with hydrocarbon, then converting the mixture into a fixed gas in one or more fixing-retorts, from whence they are conducted to scrubbers and holders.

8. The combination of the coal-distilling retort, the feeding-screw therein, the tightly-closed coal-hopper opening into the retort, and having a toothed agitator in its mouth, and the connected mechanism for operating the screw and agitator, as described.

9. A gas-generator, in combination with the vaporizing and mixing conduit or retort, a connecting-pipe, an oil-forcing pump, and a pipe connecting it with the vaporizing-conduit near the entrance of the gas-pipe.

10. A gas-generator, in combination with a vaporizing and mixing conduit or retort, a connecting-pipe, an oil-spraying nozzle in the head of the vaporizing-conduit, an oil-forcing pump, and a pipe connecting it with the oil-nozzle, as and for the purpose described.

11. The combination of the vertical retorts, the eduction-pipe S, the direct connecting-pipes, an exhauster, and a dip-pipe leading therefrom into a hydraulic seal, whereby one sealed pipe serves for all the retorts.

In testimony that I claim the foregoing as my own I affix my signature in presence of two witnesses.

JOHN L. STEWART.

Witnesses:
ISRAEL HECHT,
ROBT. J. MONTGOMERY.